Nov. 14, 1933.  G. L. BOSSARD  1,934,963
ELECTRIC MOTOR
Filed Nov. 26, 1928   2 Sheets-Sheet 1

INVENTOR
Gilbert L. Bossard
BY Maréchal and Noe
ATTORNEYS

Nov. 14, 1933.  G. L. BOSSARD  1,934,963
ELECTRIC MOTOR
Filed Nov. 26, 1928   2 Sheets-Sheet 2
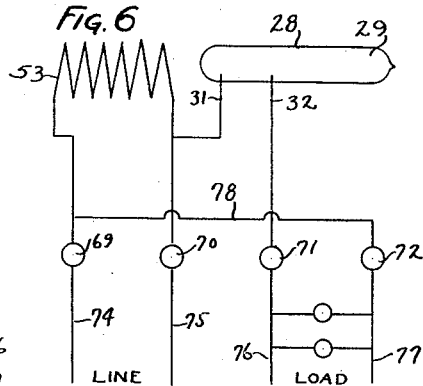
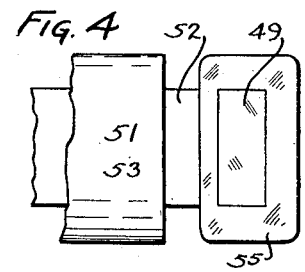
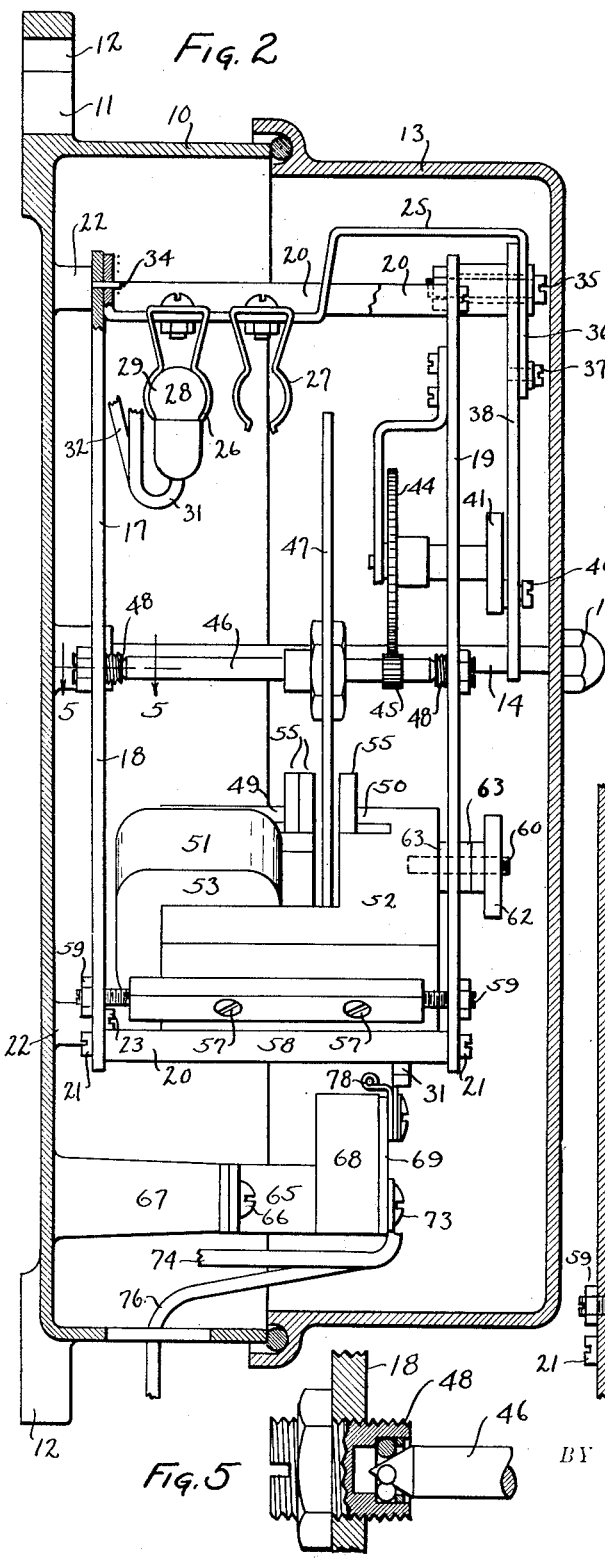
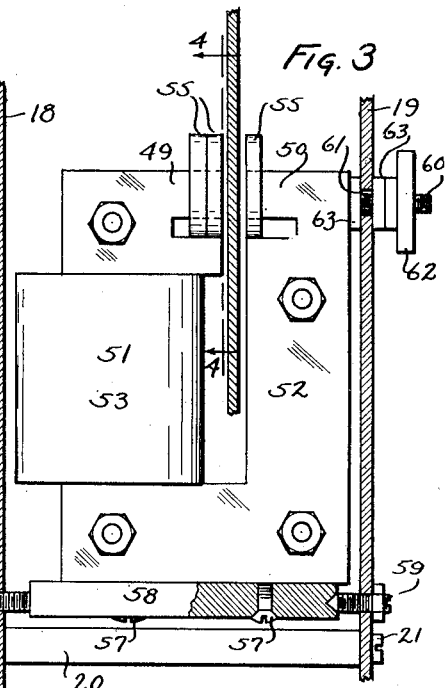
INVENTOR
Gisbert L. Bossard
Maréchal and Noe
ATTORNEYS Patented Nov. 14, 1933

1,934,963

UNITED STATES PATENT OFFICE 1,934,963

ELECTRIC MOTOR

Gisbert L. Bossard, Dayton, Ohio, assignor, by mesne assignments, to The Leland Electric Company, Dayton, Ohio, a corporation of Ohio Application November 26, 1928
Serial No. 321,953

2 Claims. (Cl. 172—278)

This invention relates to electric circuit controllers and more particularly to controllers in which an electric circuit is intermittently completed and broken.

One object of the invention is the provision of a circuit controlling apparatus having a circuit making and breaking device which is oscillated by a rotatable armature of an electro-magnetic element adapted to be energized by alternating current.

Another object of the invention is the provision of a circuit controller of this character having simple means for varying the speed of rotation of the armature and for varying the time ratio of circuit closed to circuit open position of the parts.

Further objects and advantages of the invention will be apparent from the following description and from the accompanying drawings in which—

Fig. 2 is a central vertical section on the line 2—2 of Fig. 1, showing the operating mechanism in elevation;

Fig. 3 is a section on the line 3—3 of Fig. 1;

Fig. 4 is a section on the line 4—4 of Fig. 3;

Fig. 5 is a section on the line 5—5 of Fig. 2; and

Fig. 6 is a diagram of the electrical connections.

Figure 1:
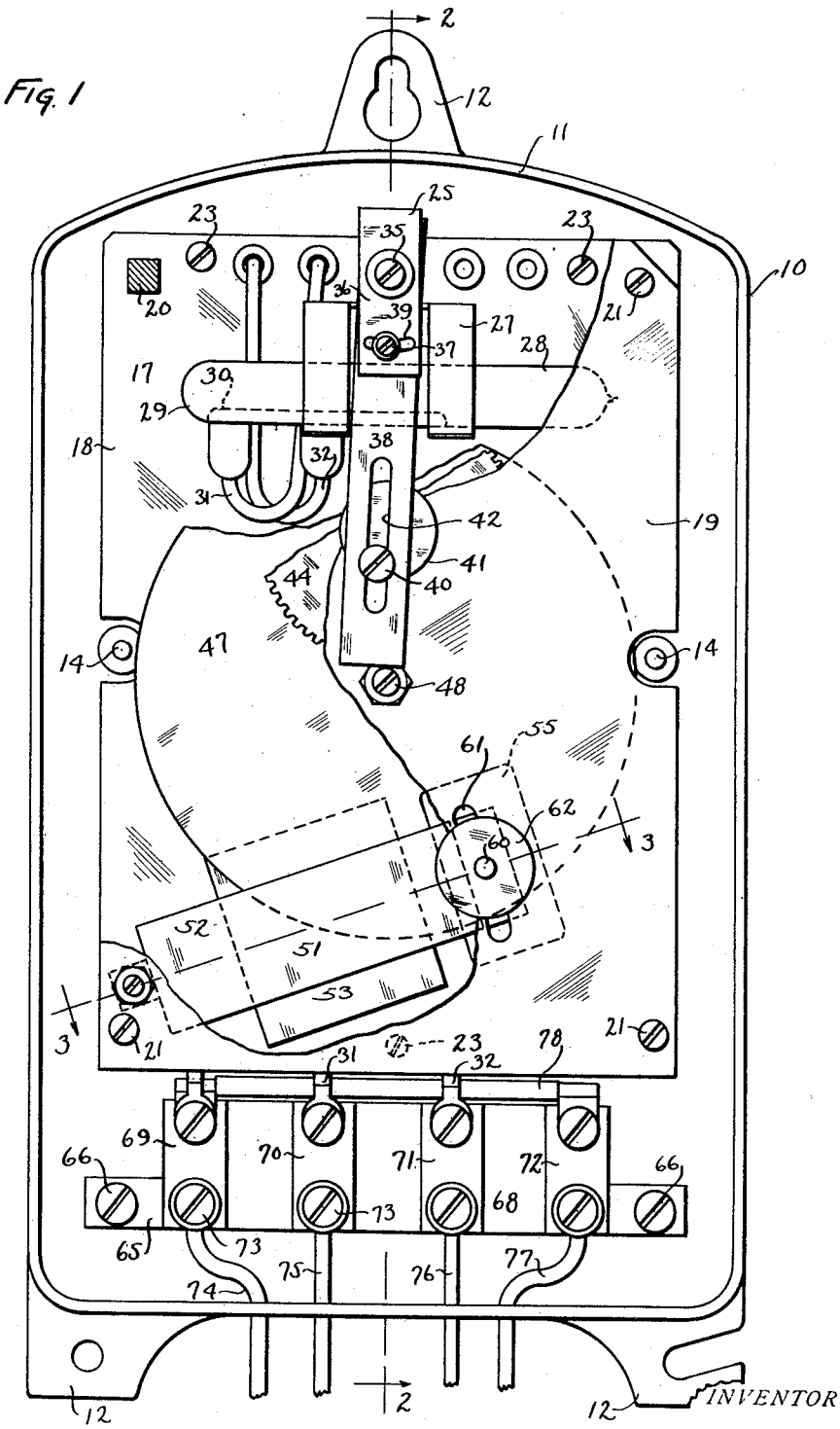
Fig. 1 is a front elevation of a circuit controller embodying the present invention, part of the frame being removed for purposes of illustration.

In accordance with this invention a circuit controlling apparatus is provided for automatically making and breaking an electric circuit. The apparatus may be employed for the automatic control of electric circuits of various kinds, for example, to automatically "flash" electric lights or signs. Referring to the drawings by reference numerals, the apparatus comprises a suitable casing 10 in which the various operating parts are housed. As shown this case embodies a back section 11 adapted to be mounted in an upright position by means of the supporting lugs 12, and a cover section 13 which is removably fastened in place by means of the studs 14 which project through holes in the cover section, and which are provided with retaining nuts 15 holding the cover section in place.

On the back section 11 of the casing is fastened a frame 17 embodying a back plate 18, front plate 19, and spacing bars 20, the spacing bars being attached to the two plates by means of suitable screws 21 or in any other suitable manner. The back plate 17 is fastened to the bosses 22 on the housing section 11 by means of screws 23 or the like.

Pivotally mounted on the frame 17 is a support 25 which holds one or more circuit making and breaking devices. Two such devices are adapted to be held in the two clips 26 and 27 which are detachably fastened to the support 25. Obviously any desired number of these devices may be employed. Preferably the contact making and breaking device 28 is in the form of a glass tube 29 which contains a suitable quantity of electrically conductive liquid 30 such as mercury which makes contact between the terminals 31 and 32 located in spaced relation preferably at the same end of the tube. When the tube is so inclined that the mercury bridges the gap between the terminals 31 and 32 a circuit will be completed through the mercury, and when the tube is tilted in the opposite direction the circuit will be broken. The tube 29 is removably held in one of the spring clips 26, 27 so that the tube is located substantially below the pivotal axis of the support 25. This support is horizontally pivoted adjacent one end on a pivot pin 34 on the back plate 18, and at its forward portion on a screw 35 or the like suitably mounted in the front plate 19 of the frame. This screw extends through the down-turned forward portion 36 of the support, this portion being spaced from the front plate 19 of the frame by a spacing sleeve 43 through which the screw 35 extends. The portion 36 of the support is adjustably fastened by a screw 37 to a downwardly extending arm 38. As shown the screw 37 is in threaded engagement with the arm 38 and extends through arcuate slot 39 in the portion 36 of the support, arm 38 being pivotally mounted with the support portion 36 on the screw 35. The relative position of the arm 38 may thus be varied with respect to the portion 36 of the support and it will be apparent that the support on which the contact making and breaking device is mounted may be oscillated back and forth so that the mercury in the tube is caused to make and break an electric circuit including the terminal 31 and 32. To cause such oscillatory movements of the support 25, the downwardly extending arm 38 is moved back and forth by an eccentric member such as a pin or screw 40 eccentrically mounted on a rotatable wheel 41 which is rotatably mounted in the front frame plate 19. The eccentric pin 40 operates in a slot 42 in the arm 38, and rotational movements of the wheel 41 are thus transformed into oscillatory movements of the arm 38 to oscillate the support 25 about its horizontal axis.

Wheel 41 is fixed to a gear 44 which meshes with a small pinion 45 provided on an armature shaft 46 carrying the armature 47 of an electro-magnetic drive element. The armature shaft 46 is mounted at opposite ends preferably in suitable anti-friction means 48 provided in the frame plates 18 and 19, and rotates preferably on a horizontal axis substantially parallel to the axis of rotation of the contact tube support 25. The armature 47 is preferably in the form of a light metallic disk such as aluminum or the like, and operates between adjacent pole faces 49 and 50 of an electro-magnet 51. This electro-magnet embodies an iron core 52, preferably of laminated soft iron, one side of the core being embraced by a winding 53 adapted to be energized by alternating current. The electro-magnet 51 is adapted to produce a steady driving torque on the armature 47 revolving it constantly about its axis when alternating current at a suitable voltage is applied to the coil 53. To provide for this driving torque, and to cause the operation of the armature 47 to be self-starting, pole-shading means is provided for the electro-magnet. This shading means, as shown, comprises copper rings 55 which embrace a part of one or both of the poles adjacent the pole faces of the magnet, so that the current generated in these shading rings 55 may react with currents generated in the armature in such a way as to cause rotational movements of the latter in a manner well known in the art. It will be apparent that the armature and the parts fixed to it are light in weight and of small moment of inertia so that it starts to move as soon as the electro-magnet is energized, and stops rotating very soon after the latter is de-energized. The armature serves merely as a drive means for the contact tube and its support, the weight of these parts being assumed by the frame.

The electro-magnet 51 is adjustably supported on the plates 18 and 19 of the frame to provide for adjustment in the speed of rotation of the armature. As shown the laminated core 52 is connected by screws 57 to a bar 58 into which extend the ends of the supporting screws 59 carried by the opposite frame plates, the bar 58 being pivotally mounted by these screws so that the pole faces of the electro-magnet may be moved towards or away from the axis of rotation of the armature 47. The core 52 of the electro-magnet is provided with a threaded stud 60 near the pole face 49, this stud extending through an arcuate slot 61 in the frame plate 19. A finger-piece or nut 62 is threaded on the stud 60, and washers 63 are provided on opposite sides of the frame plate 19, the construction being such that when the nut 62 is tightened the electro-magnet will be firmly held in place. The electro-magnet, however, may be easily positioned by loosening the nut 62 and moving it up or down, and after the desired position has been attained it may then be held firmly in position by tightening the nut thus causing the washers 63 to engage firmly against opposite sides of the frame plate 19. When the electro-magnet is in the position shown in Fig. 1, for example, the shaded poles of the magnet produce a certain turning torque on the armature, and when the electro-magnet is moved downwardly from the position shown there will be a smaller portion of the periphery of the armature in cooperative relation with the pole faces of the magnet, and consequently there will be a smaller turning force effective through a greater circumferential distance so that the armature will be rotated at a slower speed. When the electro-magnet is moved upwardly or counterclockwise from the position shown in Fig. 1, the armature will be rotated faster as the pole faces of the electro-magnet are fully effective on the armature and as the effective circular distance around the disk is smaller under such conditions. The movement of the pole faces is in a direction substantially towards or away from the axis of rotation of the armature so that considerable variations of armature speed may be obtained.

Below the frame 17 which supports the operating parts of the apparatus is a strap 65 fastened by suitable screws 66 to posts 67 on the casing section 11, the strap supporting an insulating block 68 carrying connection pieces 69, 70, 71 and 72. The connection pieces 69 and 70 are adapted to be connected by screws 73 to line wires 74 and 75. The load wires 76 and 77 are adapted to be connected to the connection pieces 71 and 72. 69 and 72 are connected together by wire 78. Connection pieces 70 and 71 are connected to the two terminals 31 and 32 of the contact tube, and the coil 53 of the electro-magnet is connected to the connection pieces 69 and 70, as shown in Fig. 6. It will thus be apparent that when alternating current is supplied through the line wires 74 and 75, the load will be intermittently connected in circuit and the circuit intermittently broken by the oscillation of the contact tube. The speed of operation of the contact tube may be changed by adjusting the position of the electro-magnet about its axis so as to move the pole faces of the magnet towards or away from the armature spindle. The rotation of the armature 47 is effective through the gearing and the eccentric pin and slot connection to the arm 38 to cause the latter to be oscillated and thus effect oscillatory movements of the contact tube. When the arm 38 is in substantial alignment with the portion 36 of the contact tube support, the tube will be substantially horizontal when the eccentric pin of screw 40 is at its lowermost position. When the parts are so related, the time during which the load is energized will be approximately the same as the time the load is de-energized. Thus when lamps are flashed by the apparatus, the periods of darkness will be the same as the periods of brightness. When the contact closed position of the parts is to be longer, and the contact open position is to be shorter, the arm 38 may be adjusted by loosening the screw 37 and so moving the arm 38 with relation to the portion 36 of the contact support as to cause the proper time ratio to be effected. Such adjusted position of the arm is shown in Fig. 1.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an electrical apparatus of the class described, a rotatable armature disk, an electro-magnet for continuously rotating said disk in one direction and having opposed poles between which said disk rotates, the core of the electro-magnet extending from its poles substantially tangentially of said disk, pole shading means for said electro-magnet, means pivotally supporting said electro-magnet on an axis spaced from said pole faces and adjacent the end of the core remote from the poles, and means for adjusting the positon of said electro-magnet for adjusting the speed of rotation of said disk.

2. In an electrical apparatus of the class described, a rotatable armature disk, an electro-magnet adapted to be energized by alternating current and continuously rotating said disk in one direction and having opposed poles between which said disks rotates, the core of the electro-magnet extending from its poles substantially tangentially of said disk, pole shading means for said electro-magnet providing shaded and unshaded areas arranged substantially tangentially of the disk with respect to one another, means pivotally supporting said electromagnet on an axis spaced from said poles and adjacent the end of the core remote from the poles and providing for movement of the poles in a direction substantially radially of the disk, and means for adjustably setting said electro-magnet for adjusting the speed of rotation of said disk.

GISBERT L. BOSSARD.